United States Patent
Kagata et al.

(10) Patent No.: US 10,883,564 B2
(45) Date of Patent: Jan. 5, 2021

(54) LIQUID DAMPER SYSTEM

(71) Applicant: TMT Machinery, Inc., Osaka (JP)

(72) Inventors: Kakeru Kagata, Kyoto (JP); Shogo Kojima, Kyoto (JP); Yukio Ishida, Nagakute (JP)

(73) Assignee: TMT Machinery, Inc., Osaka (JP)

( * ) Notice: Subject to any disclaimer, the term of this patent is extended or adjusted under 35 U.S.C. 154(b) by 49 days.

(21) Appl. No.: 15/766,217

(22) PCT Filed: Jun. 24, 2016

(86) PCT No.: PCT/JP2016/068859
§ 371 (c)(1),
(2) Date: Apr. 5, 2018

(87) PCT Pub. No.: WO2017/061147
PCT Pub. Date: Apr. 13, 2017

(65) Prior Publication Data
US 2018/0298981 A1    Oct. 18, 2018

(30) Foreign Application Priority Data

Oct. 7, 2015  (JP) ................................. 2015-199097

(51) Int. Cl.
*F16F 15/16* (2006.01)
*F16F 9/12* (2006.01)
(Continued)

(52) U.S. Cl.
CPC .......... *F16F 15/162* (2013.01); *F16D 63/002* (2013.01); *F16F 9/12* (2013.01);
(Continued)

(58) Field of Classification Search
CPC .. F16F 9/12; F16F 15/162; F16F 9/125; F16F 15/002; F16F 15/18; F16F 2222/06;
(Continued)

(56) References Cited

U.S. PATENT DOCUMENTS 6,394,240 B1 * 5/2002 Barwick ............ B60G 21/0553
188/293
2006/0109587 A1  5/2006 Shishido et al.
(Continued)

FOREIGN PATENT DOCUMENTS

CN    201265619 Y    7/2009
CN    102927188 A    2/2013
(Continued)

OTHER PUBLICATIONS

International Preliminary Report on Patentability and Written Opinion dated Apr. 10, 2018 in PCT/JP2016/068859 (with English Translation), 14 pages.
(Continued)

*Primary Examiner* — Melanie Torres Williams
(74) *Attorney, Agent, or Firm* — Oblon, McClelland, Maier & Neustadt, L.L.P.

(57) ABSTRACT

A liquid damper system for restraining vibrations generated in a rotating body includes: a liquid damper which is coaxially rotatable with the rotating body and includes a collision member, the collision member being provided in a casing in which liquid is enclosed and the liquid colliding with the collision member when moving in the circumferential direction; and a relative rotation unit configured to cause the liquid damper to rotate relative to the rotating body. Vibrations of a rotating body are effectively suppressed when a rotating body steadily rotates at a main resonance frequency, in the liquid damper system.

25 Claims, 8 Drawing Sheets

(51) Int. Cl.
*H02K 49/00* (2006.01)
*H02K 49/10* (2006.01)
*F16D 63/00* (2006.01)
*F16F 15/00* (2006.01)
*F16F 15/18* (2006.01)
*D06F 37/22* (2006.01)
*D06F 37/24* (2006.01)

(52) U.S. Cl.
CPC .......... F16F 9/125 (2013.01); F16F 15/002 (2013.01); F16F 15/16 (2013.01); F16F 15/18 (2013.01); H02K 49/00 (2013.01); H02K 49/106 (2013.01); D06F 37/225 (2013.01); D06F 37/245 (2013.01); *F16F 2222/06* (2013.01); *F16F 2222/12* (2013.01); *F16F 2230/06* (2013.01); *F16F 2230/183* (2013.01); *F16F 2232/02* (2013.01)

(58) Field of Classification Search
CPC .............. F16F 2222/12; F16F 2230/06; F16F 2230/183; F16F 2232/02
USPC ........................................................ 188/296
See application file for complete search history.

(56) References Cited

U.S. PATENT DOCUMENTS

| | | |
|---|---|---|
| 2008/0302619 A1 | 12/2008 | Cultraro |
| 2014/0077646 A1 | 3/2014 | Osterberg |
| 2015/0034435 A1 | 2/2015 | Seto et al. |
| 2015/0159722 A1* | 6/2015 | Stebbins ................. F16F 9/145 188/296 |
| 2015/0345134 A1 | 12/2015 | Takahashi et al. |
| 2016/0008826 A1* | 1/2016 | Schneider ............... B05B 3/005 188/296 |

FOREIGN PATENT DOCUMENTS

| | | |
|---|---|---|
| EP | 1 634 986 A1 | 3/2006 |
| JP | 3-81437 U | 3/1991 |
| JP | 2006-112515 A | 4/2006 |
| JP | 2012-143287 A | 8/2012 |
| JP | 2013-185649 A | 9/2013 |
| WO | 2014/104313 A1 | 7/2014 |

OTHER PUBLICATIONS

Combined Chinese Office Action and Search Report dated Mar. 21, 2019, in Patent Application No. 201680055547.9, 13 pages (with English translation).
Office Action dated Dec. 11, 2018 in corresponding Japanese Patent Application No. 2017-544386 (with English Translation), 12 pages.
International Search Report dated Aug. 2, 2016 in PCT/JP2016/068859 filed Jun. 24, 2016.
Combined Taiwanese Office Action and Search Report dated Mar. 18, 2019 in Taiwanese Patent Application No. 105132430 (with English translation), 10 pages.
Notice of Rejection dated Jul. 29, 2019 in Taiwanese Patent Application No. 105132430 (with English translation), 5 pages.
Office Action dated Nov. 27, 2019 in corresponding Indian Patent Application No. 201837011155 (with English Translation), 9 pages.
European Office Action issued in European Patent Application No. 16 853 302.4 dated Sep. 11, 2020.

* cited by examiner

LIQUID DAMPER SYSTEM

TECHNICAL FIELD

The present invention relates to a liquid damper system configured to restrain vibrations occurring in a rotating body.

BACKGROUND ART

For example, in a washing machine of Patent Literature 1, a liquid balancer is attached to the washing tub in order to restrain vibrations of the washing tub.

In this liquid balancer, liquid is enclosed in an annular container, and a plurality of obstacle members are provided inside the container.

Because the liquid collides with the obstacle members when vibrations occur, a part of the kinetic energy of the liquid is converted to heat energy and the energy is dispersed, with the result that the vibrations are restrained.

CITATION LIST

Patent Literatures

[Patent Literature 1] Japanese Unexamined Patent Publication No. 2012-143287

SUMMARY OF INVENTION

Technical Problem

Strong vibrations typically occur when the rotation number of a rotating body becomes identical with the natural frequency of the rotating body (main resonance).

In regard to vibrations occurring when the rotation number of a rotating body passes the main resonance frequency while the rotating body accelerates or decelerates or vibrations occurring when a rotating body steadily rotates at a rotation number different from the main resonance frequency, a liquid damper such as the liquid balancer of Patent Literature 1 is able to restrain such vibrations.

However, when a rotating body steadily rotates at the main resonance frequency, the rotating body and the liquid in the liquid damper rotate together because the orbital revolution of the whirling rotating body is matched with the autorotation of the rotating body.

When this is the case, the liquid is adhered to the inner wall surface of the liquid damper and becomes immovable on account of a centrifugal force, and the energy is not dispersed by the collision of the liquid. For this reason, the vibrations are not effectively restrained.

In consideration of this problem, an object of the present invention is to effectively restrain vibrations of a rotating body when the rotating body steadily rotates at amain resonance frequency, in a liquid damper system which is configured to restrain vibrations occurring in the rotating body.

Solution to Problem

A liquid damper system of the present invention, which is for restraining vibrations occurring in a rotating body, includes: a liquid damper which is coaxially rotatable with the rotating body and includes a collision member, the collision member being provided in a casing in which liquid is enclosed, and the liquid colliding with the collision member when moving in the circumferential direction; and a relative rotation unit configured to cause the liquid damper to rotate relative to the rotating body.

In the liquid damper system of the present invention, the liquid damper rotates relative to the rotating body on account of the relative rotation unit, in the same or opposite direction. For this reason, even when the rotating body steadily rotates at the main resonance frequency, the liquid in the liquid damper does not rotate together with the rotating body as the orbital revolution of the whirling rotating body is not matched with the autorotation of the rotating body, and hence the problem that the liquid is adhered to the inner wall surface of the liquid damper on account of a centrifugal force and becomes immovable is prevented.

For this reason, because the liquid always collides with the collision members, a part of the kinetic energy of the liquid is converted to heat energy and the energy is dispersed, with the result that the vibrations of the rotating body are effectively restrained even when the rotating body steadily rotates at the main resonance frequency.

Preferably, as the relative rotation unit, an air resistance imparting member is provided to increase air resistance when the liquid damper rotates.

With this air resistance imparting member, rotational resistance is exerted to the liquid damper when the liquid damper rotates, with the result that the rotation speed of the liquid damper becomes lower than that of the rotating body. In this way, the liquid damper is arranged to rotate relative to the rotating body.

Preferably, the air resistance imparting member is a plate member having a surface intersecting with the rotational direction of the liquid damper.

When the plate members having a surface intersecting with the rotational direction of the liquid damper is used as the air resistance imparting member, the structure of the air resistance imparting member is simplified.

Preferably, the plate member is provided on an outer circumferential surface of the liquid damper.

Because the plate member is provided on the outer circumferential surface of the liquid damper, the distance between the acting position of the air resistance and the rotational center of the liquid damper is long, and hence the rotational resistance torque acting on the liquid damper is large.

The rotation speed of the liquid damper is therefore efficiently decreased, and hence the liquid damper certainly rotates relative to the rotating body.

Preferably, the plate member is provided on an end face in the axial direction of the liquid damper.

This arrangement restrains increase in size of the liquid damper system in the radial direction, and the liquid damper system is downsized.

Preferably, the plate member is tilted toward downstream in the rotational direction as compared to the direction orthogonal to the outer circumferential surface of the liquid damper.

When the plate member is shaped in this manner, outward escape of air in the centrifugal direction along the plate member is restrained when the liquid damper rotates, and the air resistance exerted to the plate member is therefore increased.

In addition to the above, preferably, a fluid blowing unit configured to blow out fluid so that a hydrostatic pressure is exerted to the plate member in the direction opposite to the rotational direction is further provided.

With such a fluid blowing unit, the rotational resistance exerted to the plate members is increased, and hence the casing certainly rotates relative to the rotating body.

A brake mechanism including an electromagnetic effect target which is provided in the liquid damper and is a target of an electromagnetic effect and an electromagnetic effector which exerts the electromagnetic effect to the electromagnetic effect target may be provided as the relative rotation unit.

When the electromagnetic brake mechanism is employed as the relative rotation unit, a braking force is exerted to the liquid damper when the liquid damper rotates, with the result that the rotation speed of the liquid damper is arranged to be lower than that of the rotating body.

In this way, the liquid damper is arranged to rotate relative to the rotating body.

Specific structures of the electromagnetic effector and the electromagnetic effect target will be detailed later.

A gear mechanism may be provided as the relative rotation unit, the gear mechanism including gear portions formed on the outer circumferential surface of the liquid damper, a gear engaged with the gear portions, and a driving unit configured to generate a rotational torque in the liquid damper by rotating the gear.

As the rotational torque is generated in the liquid damper by driving the gear, the liquid damper is arranged to rotate relative to the rotating body.

Preferably, the driving unit is a variable speed motor in which the rotation speed of an output shaft is variable.

The rotation speed of the gear is therefore adjustable, and hence the rotation speed of the liquid damper is variable. On this account, the rotation speed of the liquid damper is adjustable in accordance with the state of vibration of the rotating body, and hence the degree of vibration suppression is further improved.

Advantageous Effects of Invention

In the liquid damper system of the present invention, because the relative rotation unit which causes the liquid damper to rotate relative to the rotating body is provided, the liquid in the liquid damper does not rotate together with the rotating body, and the vibrations of the rotating body are effectively restrained even when the rotating body steadily rotates at the main resonance frequency.

DESCRIPTION OF EMBODIMENTS

First Embodiment

The following will describe a liquid damper system of an embodiment of the present invention.

Figure 1:
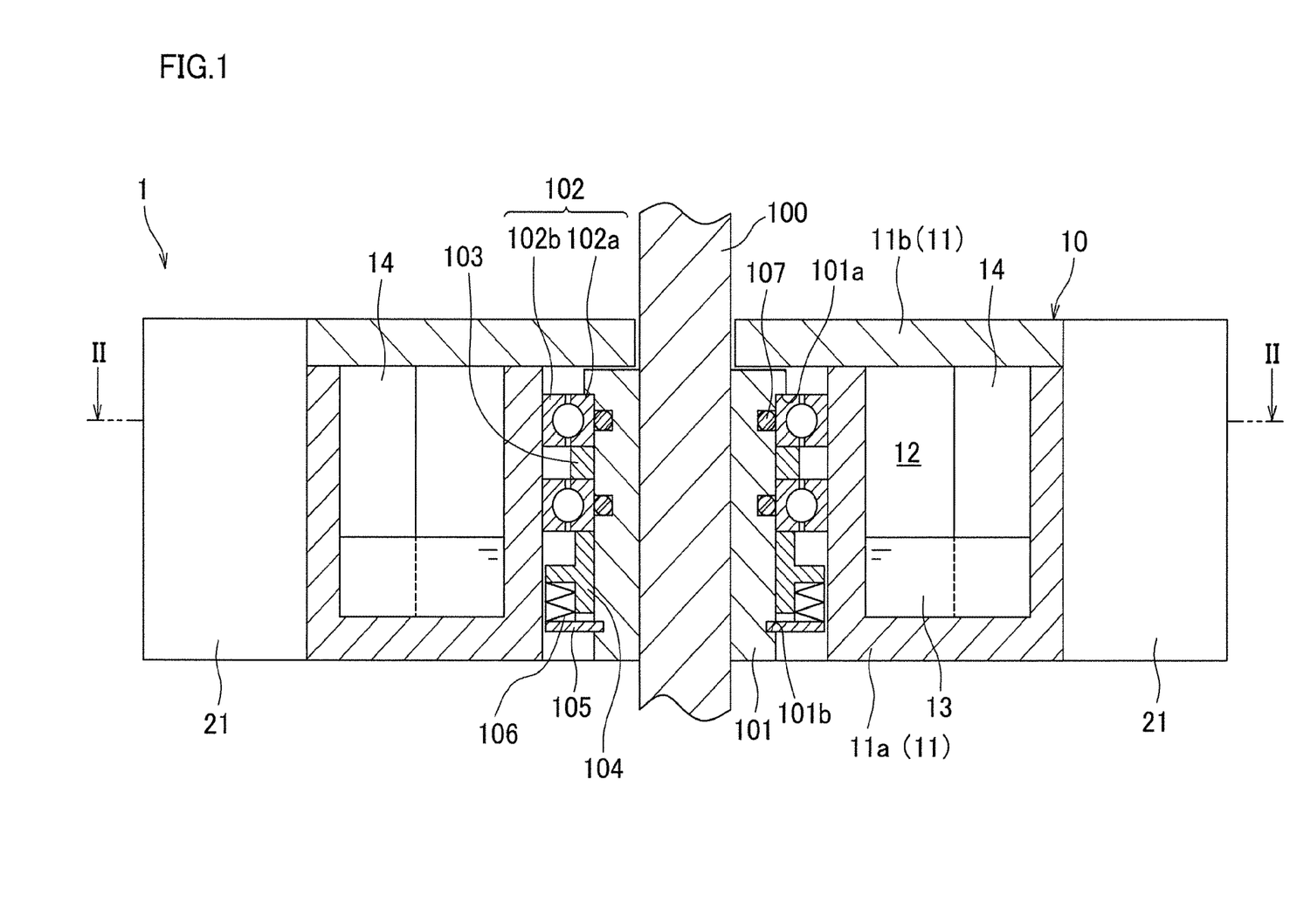
FIG. 1 is a cross sectional view of a liquid damper system of First Embodiment.

FIG. 1 is a cross sectional view of the liquid damper system of First Embodiment, showing a cross section taken along the axis of a rotating body 100.

Figure 2:
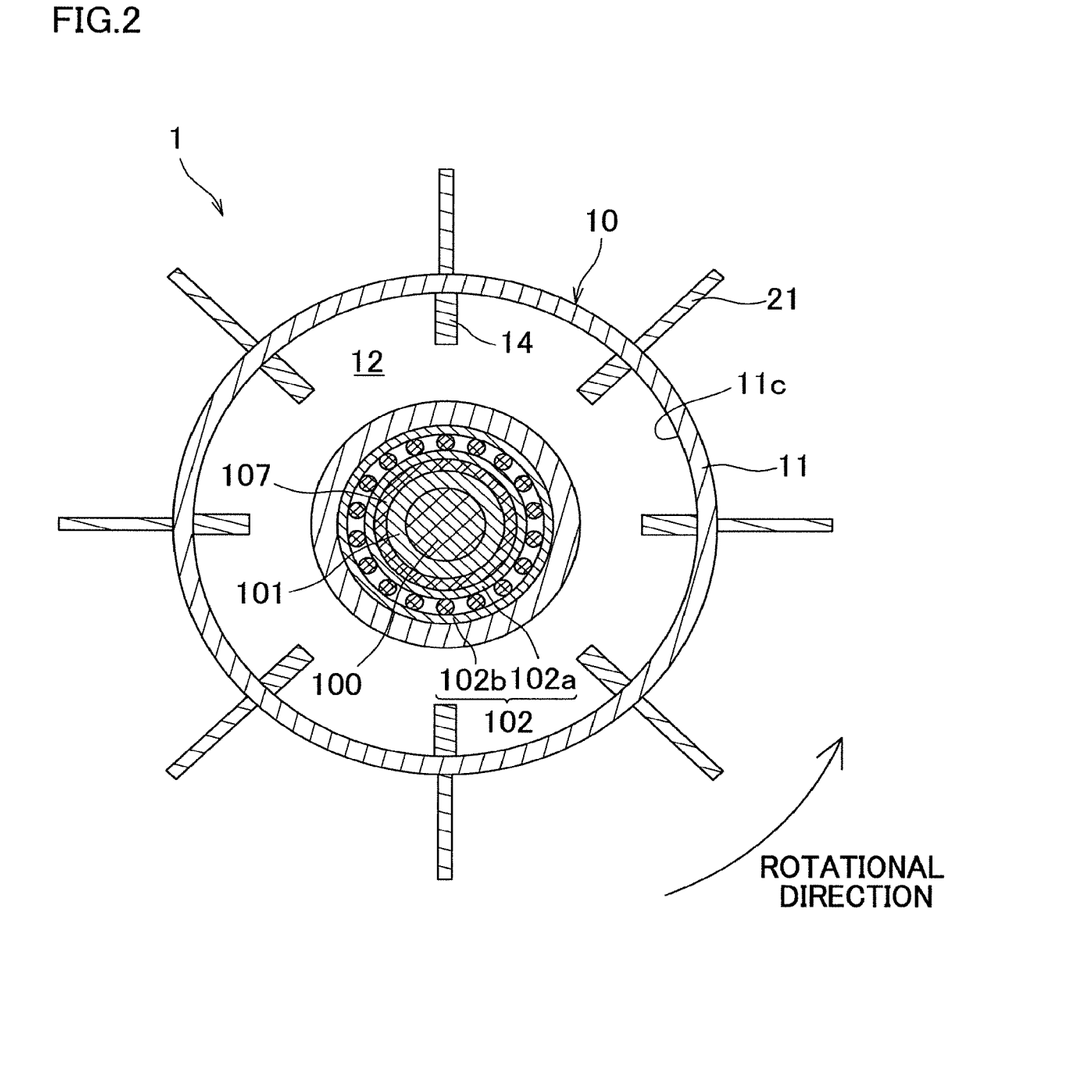
FIG. 2 is a cross sectional view of a cross section taken at the II-II line in FIG. 1.

FIG. 2 is a cross sectional view of a cross section taken at the II-II line in FIG. 1.

While the present embodiment assumes that the axial direction of the rotating body 100 is identical with the up-down direction, the axial direction of the rotating body 100 may be different from the up-down direction.

The liquid damper system 1 is a damper system including a liquid damper 10.

In the liquid damper 10, liquid 13 is enclosed in an internal space 12 which is formed in a casing 11. The liquid damper 10 is attached to the rotating body 100 to be coaxially rotatable with the rotating body 100.

While the liquid 13 in the present embodiment is water, the liquid 13 is not limited to water.

Before the liquid damper 10 is detailed, an attaching mechanism for attaching the liquid damper 10 to the rotating body 100 is described.

On the outer circumferential surface of the rotating body 100, a cylindrical boss 101 is fixed. On the outer circumferential surface of the boss 101, two bearings, i.e., upper and lower bearings 102 are fixed.

While each bearing 102 in the present embodiment is a ball bearing, each bearing 102 may not be a ball bearing.

At an upper portion of the outer circumferential surface of the boss 101, a stepped portion 101*a* is formed.

The upper bearing 102 is externally fitted to the boss 101 while being in contact with this stepped portion 101*a*.

Below the upper bearing 102, a first spacer 103, the lower bearing 102, a second spacer 104, and an engaging member 105 are provided in this order and externally fitted to the boss 101.

The engaging member 105 is, for example, a C-ring and is fitted into an annular groove 101*b* which is formed in the outer circumferential surface of the boss 101.

Between the second spacer 104 and the engaging member 105, a biasing member 106 which is formed of a disc spring, a corrugated washer, and the like is provided.

Because the two bearings 102 are biased toward the stepped portion 101*a* by this biasing member 106, a suitable pre-load is applied to the bearings 102.

On the inner side in the radial direction of each bearing 102, an O-ring 107 is provided.

An inner race 102*a* of the bearing 102 is fixed to the boss 101, whereas an outer race 102*b* of the bearing 102 is fixed to the casing 11 of the liquid damper 10.

The liquid damper 10 rotates together with the rotating body 100 on account of frictions of the bearings 102.

In this connection, in the present invention, the degree of vibration suppression is improved by arranging the liquid damper 10 to actively rotate relative to the rotating body 100 as described below.

The following will describe the structure of the liquid damper 10.

The liquid damper 10 is basically structured such that the liquid 13 is enclosed in the internal space 12 of the casing 11.

The casing 11 is mainly formed of a casing main body 11a and a 11d member 11b.

The casing main body 11a is a hollow cylinder at the center of which a through hole is formed to allow the rotating body 100 to penetrate the same, and hence the annular internal space 12 is formed therein.

The internal space 12 is open at an upper part, and the 11d member 11b is fixed to the upper surface of the casing main body 11a by a bolt or the like in order to close the opening.

As shown in FIG. 2, on an inner wall surface 11c which is on the outer side in the centrifugal direction (outer side in the radial direction) of the casing 11, plate-shaped collision members 14 are provided. These collision members 14 protrude from the inner wall surface 11c toward the internal space 12 so that the liquid may collide with them when moving in the circumferential direction.

Eight collision members 14 are provided in total at equal intervals in the circumferential direction. The angle between neighboring collision members 14 is 45 degrees.

The number and disposition of the collision members 14 are not limited to this and may be suitably altered.

On the outer circumferential surface of the liquid damper 10 (casing 11), plate members 21 are provided to protrude outward in the centrifugal direction. Each plate member 21 has a surface intersecting with the rotational direction of the liquid damper 10.

Eight plate members 21 are provided in total at equal intervals in the circumferential direction. The angle between neighboring plate members 21 is 45 degrees.

The number and disposition of the plate members 21 are not limited to this and may be suitably altered.

The following will describe how the liquid damper system 1 structured as above operates.

When the rotating body 100 is rotationally driven by an unillustrated driving unit, the liquid damper 10 is passively driven on account of the frictions of the bearings 102.

As the liquid damper 10 rotates, air resistance is exerted to the plate members 21, with the result that rotational resistance is generated against the liquid damper 10.

The rotational resistance increases as the rotation speed of the liquid damper 10 increases. When the rotational resistance becomes larger than the friction forces of the bearings 102, the rotation speed of the liquid damper 10 starts to delay from that of the rotating body 100.

As a result, the casing 11 rotates relative to the rotating body 100.

Advantageous Effects

In the liquid damper system 1 of the present embodiment, the liquid damper 10 rotates relative to the rotating body on account of a relative rotation unit formed of the plate members 21.

For this reason, even when the rotating body 100 steadily rotates at the main resonance frequency, the liquid 13 in the liquid damper 10 does not rotate together with the rotating body 100, and hence the problem that the liquid 13 is adhered to the inner wall surface 11c of the liquid damper 10 on account of a centrifugal force and becomes immovable is prevented. For this reason, because the liquid 13 always collides with the collision members 14, a part of the kinetic energy of the liquid 13 is converted to heat energy and the energy is dispersed, with the result that the vibrations of the rotating body 100 are effectively restrained even when the rotating body 100 steadily rotates at the main resonance frequency.

Figure 3:
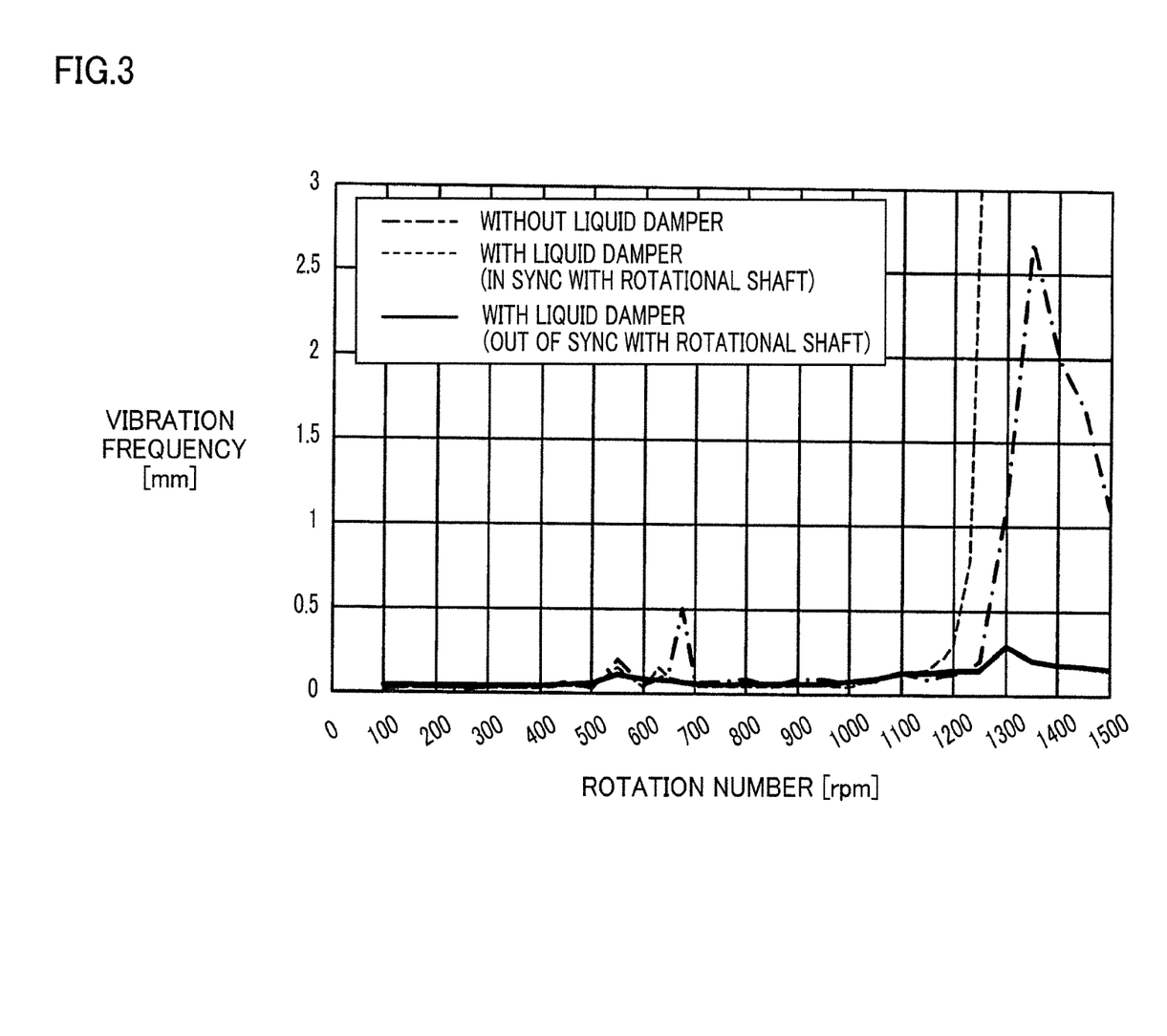
FIG. 3 is a graph showing results of a verification experiment.

An experiment was done to verify the vibration suppression for the rotating body 100 by the liquid damper system 1. The verification experiment was done in the following three cases: the liquid damper 10 was not attached to the rotating body 100; the liquid damper 10 was attached to the rotating body 100 and the rotation number of the liquid damper 10 was arranged to be identical with (in sync with) the rotation number of the rotating body 100; and the liquid damper 10 was attached to the rotating body 100 and the rotation number of the liquid damper 10 was arranged to be different from (out of sync with) that of the rotating body 100.

In each case, the rotation number of the rotating body 100 was increased at predetermined intervals, and a vibration frequency of the rotating body 100 was measured when steady rotation was achieved at each rotation number.

In the cases where the liquid damper 10 was provided, the liquid damper 10 was arranged to be in sync with the rotating body 100 as the plate members 21 were not attached, whereas the liquid damper 10 was arranged to be out of sync with the rotating body 100 as the plate members 21 were attached.

FIG. 3 is a graph showing results of the verification experiment.

When the liquid damper 10 was not used, large main resonance occurred when the rotation number of the rotating body 100 was 1350 rpm.

When the liquid damper 10 was attached to the rotating body 100 (but the plate members 21 were not provided) and the liquid damper 10 was arranged to be in sync with the rotating body 100, the main resonance was not decreased but increased as compared to the case where the liquid damper 10 was not attached. This is presumably because, when the rotation number of the liquid damper 10 is identical with that of the rotating body 100, the rotating body 100 and the liquid 13 in the liquid damper 10 rotate together, with the result that collision of the liquid 13 with the collision members 14 does not occur and hence energy dispersion does not occur.

Meanwhile, when the liquid damper 10 and the plate members 21 were attached and the liquid damper 10 was arranged to be out of sync with the rotating body 100, the main resonance was hardly noticeable, indicating that the vibrations of the rotating body 100 were restrained in a wide range of rotation numbers. In the experiment, the percentage of water as the liquid 13 relative to the capacity of the internal space 12 was about 17%. This proves that a significantly high degree of vibration suppression is achieved even when the amount of the liquid 13 is small.

This is presumably because the weight of the liquid 13 is apparently increased by a centrifugal force and hence the energy of the collision is increased.

By the way, when the liquid damper 10 rotates, a centrifugal force is exerted to the liquid 13 in the liquid damper 10, with the result that the liquid 13 is adhered to the inner wall surface 11c on the outer side in the centrifugal direction. In this regard, when the collision members 14 are provided to protrude from the inner wall surface 11c toward the internal space 12 as in the present embodiment, it is possible to prevent the liquid 13 adhered to the inner wall surface 11c from rotating en masse. Energy is therefore dispersed because the collision of the liquid 13 occurs even in the steady state.

In addition to the above, in the present embodiment, air resistance imparting members (plate members 21) are provided as a relative rotation unit to increase the air resistance during the rotation of the liquid damper 10. On this account, rotational resistance is imparted to the liquid damper 10 when the liquid damper 10 rotates, with the result that the rotation speed of the liquid damper 10 becomes lower than that of the rotating body 100.

In this way, the liquid damper 10 is arranged to rotate relative to the rotating body 100.

In addition to the above, because the air resistance imparting members of the present embodiment are the plate members 21 each having a surface intersecting with the rotational direction of the liquid damper 10, the structure of each air resistance imparting member is simple.

In addition to the above, because in the present embodiment the plate members 21 are provided on the outer circumferential surface of the liquid damper 10, the distance between the acting position of the air resistance and the rotational center of the liquid damper 10 is long, and hence the rotational resistance torque acting on the liquid damper 10 is large. The rotation speed of the liquid damper 10 is therefore efficiently decreased, and hence the liquid damper 10 certainly rotates relative to the rotating body 100.

(Modification 1)

Figure 4:
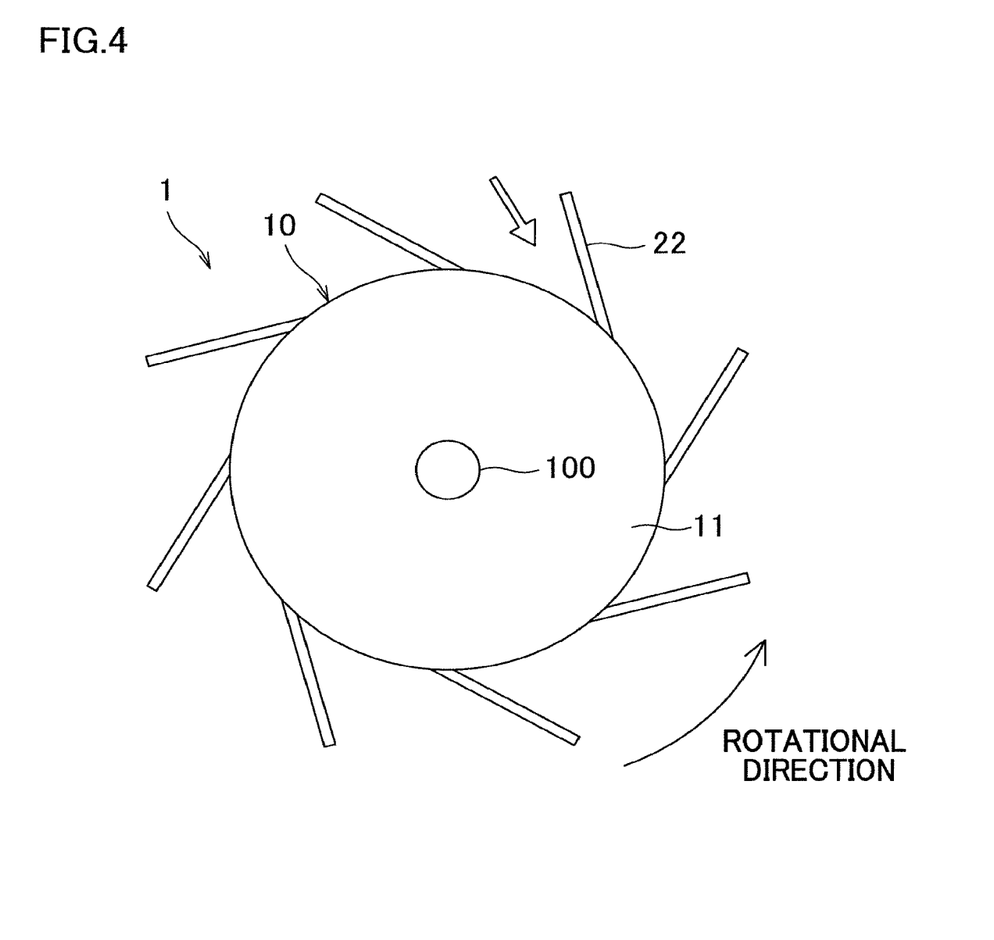
FIG. 4 is a top view showing Modification 1 of First Embodiment.

FIG. 4 is a top view showing Modification 1 of First Embodiment. In this modification, each plate member 22 is not along the radial direction but is shaped such that the plate member 22 is tilted toward the downstream in the rotational direction as compared to the direction orthogonal to the outer circumferential surface of the liquid damper 10.

With such plate members 22, when the liquid damper 10 rotates, radially outward escape of air along each plate member 22 is restrained and capture of air in the space between each plate member 22 and the liquid damper 10 is facilitated, as indicated by the outlined arrow in FIG. 4. The air resistance exerted to each plate member 22 is therefore increased.

(Modification 2)

Figure 5:
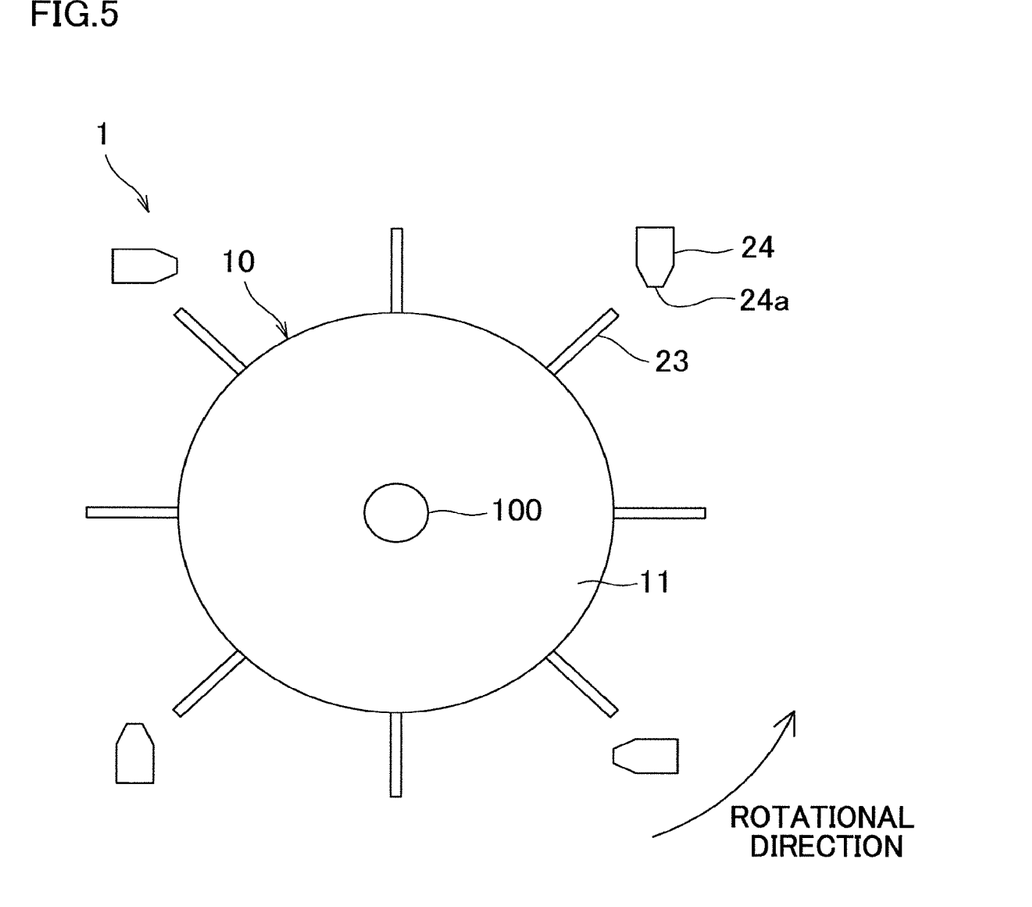
FIG. 5 is a top view showing Modification 2 of First Embodiment.

FIG. 5 is a top view showing Modification 2 of First Embodiment. The shape of each plate member 23 and the like in this modification are identical with those shown in FIG. 2, but fluid blowing units 24 are additionally provided.

The fluid blowing units 24 are provided around the liquid damper 10 and each blows out fluid such as air through an outlet 24a. Because each outlet 24a is provided to face in the direction substantially opposite to the rotational direction of the liquid damper 10, the fluid blowing units 24 exert hydrostatic pressures to the plate members 23 in the direction opposite to the rotational direction of the liquid damper 10.

The rotational resistance exerted to the plate members 23 is therefore increased, and hence the liquid damper 10 certainly rotates relative to the rotating body 100.

It is noted that the number and disposition of the fluid blowing units 24 are not limited to those shown in FIG. 5, and may be suitably altered.

Second Embodiment

Figure 6:
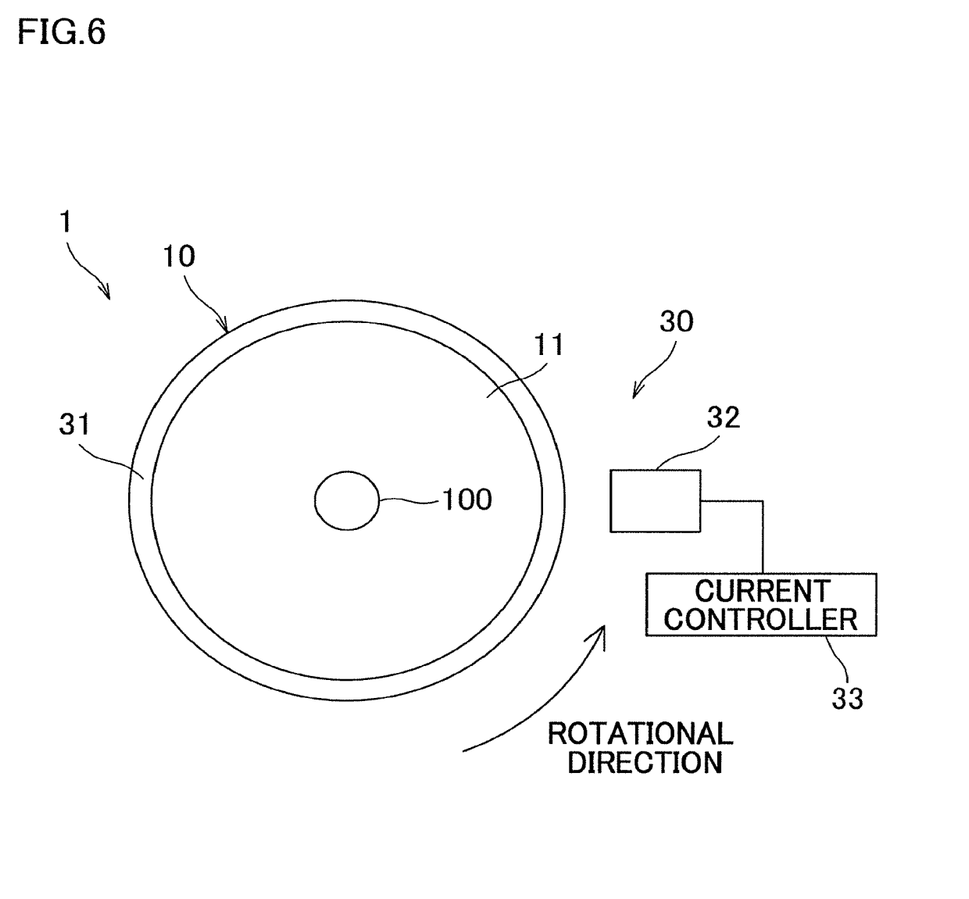
FIG. 6 is a top view showing a liquid damper system of Second Embodiment.

FIG. 6 is a top view showing a liquid damper system of Second Embodiment.

In a liquid damper system 1 of this embodiment, an electromagnetic brake mechanism 30 is provided as a relative rotation unit by which the liquid damper 10 is rotated relative to the rotating body 100.

This brake mechanism 30 includes a conductor 31 (electromagnetic effect target) provided on the outer circumferential surface of the liquid damper 10 (casing 11), a coil 32 (electromagnetic effector) provided to be apart from the outer circumferential surface of the liquid damper 10, and a current controller 33 controlling a current supplied to the coil 32.

It is noted that the numbers and dispositions of the conductor 31 and the coil 32 are not limited to those shown in FIG. 6, and may be suitably altered.

For example, a plurality of coils 32 may be provided along the circumferential direction at regular intervals.

When a current is supplied to the coil 32 by the current controller 33, a magnetic force generated between a magnetic flux formed around the coil 32 by electromagnetic induction and a magnetic flux formed due to an eddy current generated in the conductor 31 of the liquid damper 10 functions as a braking force.

To put it differently, when the liquid damper 10 rotates, a braking force is exerted to the liquid damper 10 by the brake mechanism 30, with the result that the rotation speed of the liquid damper 10 is arranged to be lower than that of the rotating body 100.

In this way, the liquid damper 10 is arranged to rotate relative to the rotating body 100.

According to the present embodiment, the magnitude of a magnetic field generated around the coil 32 is changeable by adjusting the current supplied to the coil 32 by the current controller 33, and hence the braking force generated between the conductor 31 and the coil 32 is changeable.

The rotation speed of the liquid damper 10 is therefore adjustable in accordance with the state of vibrations of the rotating body 100, and hence the degree of vibration suppression is further improved.

Furthermore, a larger braking force is obtained when the conductor 31 is constituted by a magnetic body, because a larger eddy current is generatable.

In the present embodiment, the electromagnetic effector 32 may be a permanent magnet instead of a coil.

The current controller 33 can be omitted in this case, and hence the relative rotation unit is relatively easily constructed.

According to a modification of the present embodiment, the electromagnetic effect target 31 provided on the outer circumferential surface of the liquid damper 10 may be a permanent magnet.

In this modification, a large braking torque is generatable by suitably controlling the frequency of an alternating current supplied to the coil 32 by the current controller 33 connected to the coil 32.

Third Embodiment

Figure 7:
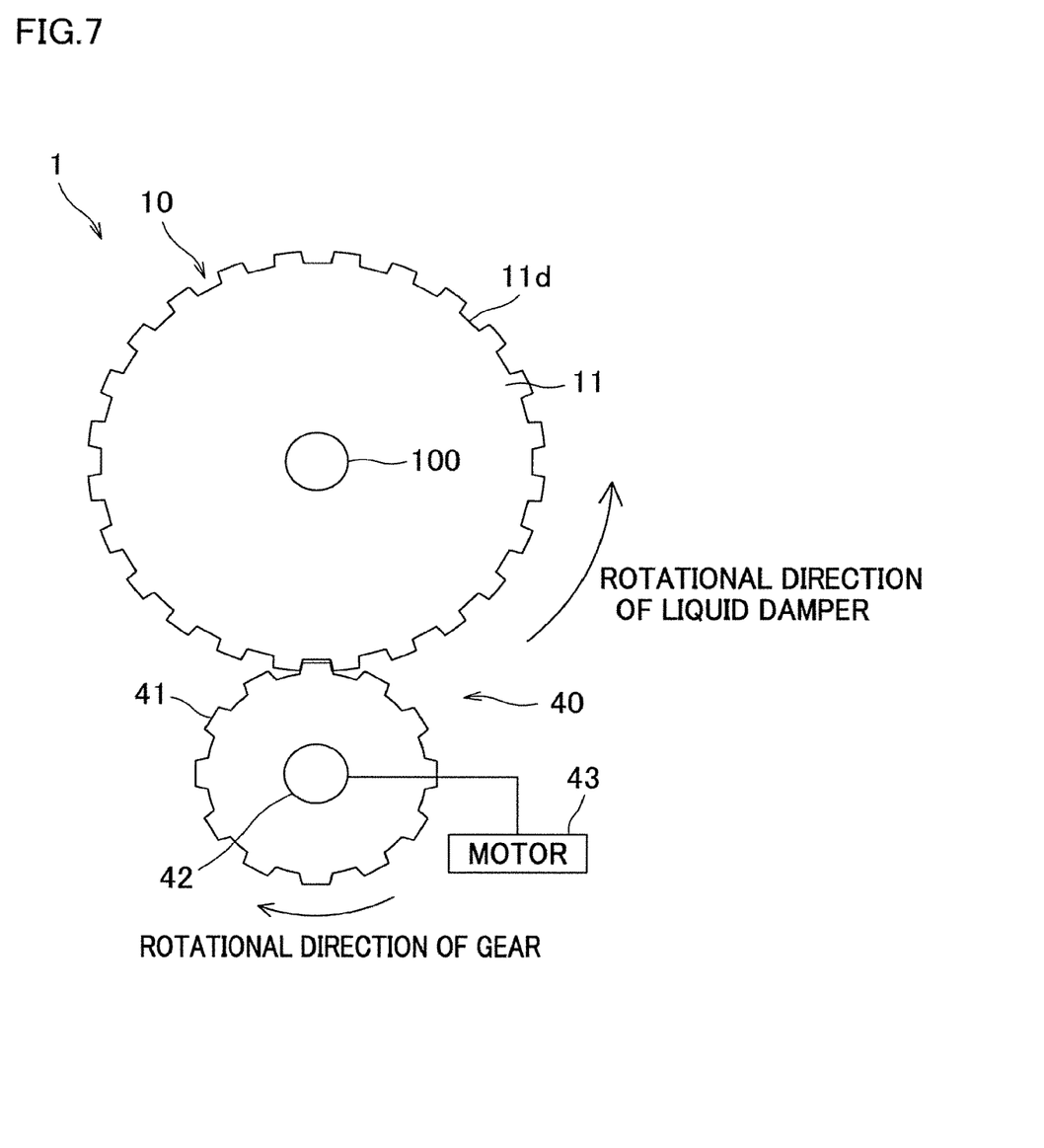
FIG. 7 is a top view showing a liquid damper system of Third Embodiment.

FIG. 7 is a top view showing a liquid damper system of Third Embodiment.

In a liquid damper system 1 of this embodiment, a gear mechanism 40 is provided as a relative rotation unit by which the liquid damper 10 is rotated relative to the rotating body 100.

This gear mechanism 40 includes gear portions 11d formed on the outer circumferential surface of the liquid damper 10 (casing 11), a gear 41 engaged with the gear portions 11d, a rotational shaft 42 connected to the gear 41 and substantially in parallel to the rotating body 100, and a motor 43 (driving unit) having an unillustrated output shaft connected to the rotational shaft 42 and configured to rotationally drive the rotational shaft 42.

A housing (not illustrated) of the motor 43 is, for example, attached to the rotating body 100 via a bearing which is substantially without friction, and the housing is provided so that the position of the motor 43 is not varied when the rotating body 100 and/or the liquid damper 10 rotates.

When the liquid damper 10 rotates, the gear 41 also rotates in the direction shown in FIG. 7.

At this stage, when the motor 43 is driven at a frequency lower than the rotational frequency of the gear 41 which is in sync with the rotation of the liquid damper 10, the motor 43 functions as a brake.

On this account, a rotational resistance is exerted to the liquid damper 10 which rotates on account of the rotation of the rotating body 100, with the result that the rotation speed of the liquid damper 10 becomes lower than that of the rotating body 100.

In this way, the liquid damper 10 is arranged to rotate relative to the rotating body 100.

In this embodiment, the motor 43 is preferably a variable speed motor in which the rotation speed of the output shaft is variable.

The rotation speed of the gear 41 is therefore adjustable, and hence the rotation speed of the liquid damper 10 is variable. On this account, the rotation speed of the liquid damper 10 is adjustable in accordance with the state of vibration of the rotating body 100, and hence the degree of vibration suppression is further improved.

OTHER EMBODIMENTS

Although the embodiments of the present invention have been described, the present invention is not limited to the above and can be suitably changed within the scope of the present invention as described below.

For example, according to the embodiments above, the collision members 14 protrude from the inner wall surface 11c which is on the outer side in the centrifugal direction of the casing 11 toward the internal space 12.

Alternatively, the collision members 14 may protrude toward the internal space 12 from the inner wall surface on the inner side in the centrifugal direction of the casing 11, or may protrude toward the internal space 12 from the ceiling or the bottom surface of the casing 11.

Alternatively, each collision member 14 may be a plate-shaped member which is provided to bridge the gap between the inner wall surface on the inner side in the centrifugal direction and the inner wall surface on the outer side in the centrifugal direction and has an opening or a notch which penetrates the plate-shaped member in the circumferential direction.

Alternatively, each collision member 14 may not be plate-shaped and may be column-shaped or block-shaped. Furthermore, each collision member 14 may be an uneven portion or a corrugated portion formed on a side or bottom surface of the casing 11.

In the embodiments above, the internal space 12 of the casing 11 is a single chamber.

Alternatively, a partition wall may be provided in the internal space 12 along the circumferential direction to divide the internal space 12 into plural spaces in the radial direction.

In such a case, a collision member 14 is provided in each of these spaces formed by the division.

While in First Embodiment the plate members 21 to 23 are provided on the outer circumferential surface of the liquid damper 10 (casing 11), the plate members 21 to 23 may be formed on an end face (an upper surface or a lower surface) in the axial direction of the liquid damper 10 (casing 11), in addition to or instead of the outer circumferential surface.

Figure 8:
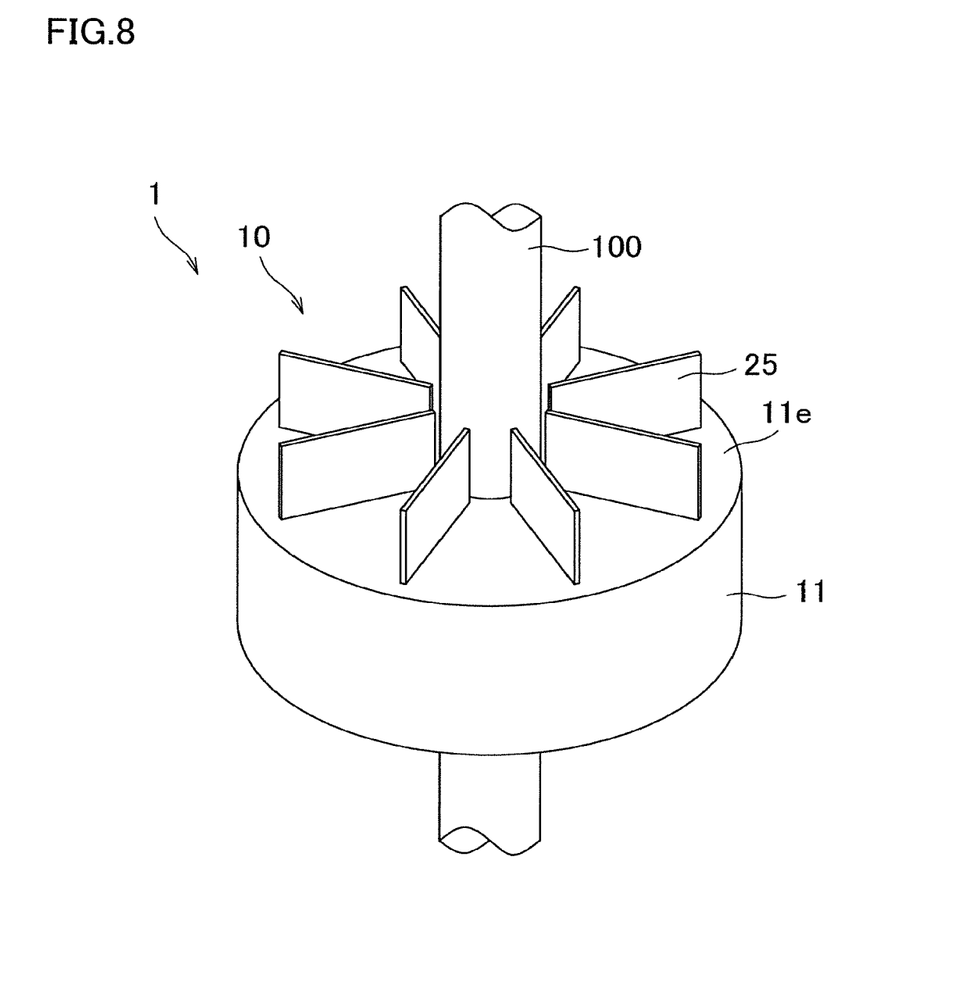
FIG. 8 is a perspective view of a liquid damper system of another embodiment.

For example, in a modification shown in FIG. 8, plate members 25 are provided on an upper surface 11e of a liquid damper 10 (casing 11). In this regard, in addition to or instead of the upper surface 11e, plate members 25 may be provided on a lower surface.

This arrangement restrains increase in size of the liquid damper system 1 in the radial direction, and the liquid damper system 1 is downsized.

In Second Embodiment, the conductor 31 is provided in the liquid damper 10 as an electromagnetic effect target and the coil 32 is provided around the liquid damper 10 as an electromagnetic effector. Alternatively, a coil may be provided in the liquid damper 10 as an electromagnetic effect target whereas a permanent magnet may be provided around the liquid damper 10 as an electromagnetic effector.

In this case, the rotation speed of the liquid damper 10 is adjustable by changing the distance to the liquid damper 10 by moving the permanent magnet.

While in First to Third Embodiments the rotation speed of the liquid damper 10 is lower than that of the rotating body 100, a difference in relative speed may be achieved by arranging the rotation speed of the liquid damper 10 to be higher than that of the rotating body 100.

For example, the direction of the fluid blowing unit 24 in Modification 2 of First Embodiment (see FIG. 5) may be changed to exert a hydrostatic pressure in the rotational direction of the liquid damper 10.

Alternatively, in Third Embodiment (see FIG. 7), the rotation speed of the liquid damper 10 may be arranged to be higher than that of the rotating body 100, by means of the motor 43.

In addition to the above, the rotational direction of the liquid damper 10 may be arranged to be opposite to the rotational direction of the rotating body 100.

For example, the liquid damper 10 may be rotated in the direction opposite to the rotation of the rotating body 100 by increasing the speed of fluid blown out from the fluid blowing unit 24 in Modification 2 of First Embodiment (see FIG. 5).

Alternatively, in Third Embodiment (see FIG. 7), the liquid damper 10 may be arranged to rotate in the direction opposite to that of the rotating body 100, by means of the motor 42.

REFERENCE SIGNS LIST

1: liquid damper system
10: liquid damper
11: casing
11d: gear portion
12: internal space
13: liquid damper
14: collision member
21 to 23: plate member (relative rotation unit, air resistance imparting member)
24: fluid blowing unit
30: brake mechanism (relative rotation unit)
31: conductor (electromagnetic effect target)
32: coil (electromagnetic effector)
33: current controller
40: gear mechanism (relative rotation unit)
41: gear
43: motor (driving unit)
100: rotating body

The invention claimed is:
1. A liquid damper system, comprising:
a rotating body;

a liquid damper which is coaxially rotatable with the rotating body and restrains vibrations occurring in the rotating body; and a relative rotation unit configured to cause the liquid damper to rotate relative to the rotating body, wherein the liquid damper includes a casing in which liquid is enclosed and a collision member which is configured to rotate together with the casing, the liquid in the casing colliding with the collision member when moving in a circumferential direction.

2. The liquid damper system according to claim 1, wherein, as the relative rotation unit, an air resistance imparting member is provided to increase air resistance when the liquid damper rotates.

3. The liquid damper system according to claim 2, wherein, the air resistance imparting member is a plate member having a surface intersecting with the rotational direction of the liquid damper.

4. The liquid damper system according to claim 3, wherein, the plate member is provided on an outer circumferential surface of the liquid damper.

5. The liquid damper system according to claim 3, wherein, the plate member is provided on an end face in the axial direction of the liquid damper.

6. The liquid damper system according to claim 4, wherein, the plate member is tilted toward downstream in the rotational direction as compared to the direction orthogonal to the outer circumferential surface of the liquid damper.

7. The liquid damper system according to claim 3, further comprising a fluid blowing unit configured to blow out fluid so that a hydrostatic pressure is exerted to the plate member in the direction opposite to the rotational direction.

8. The liquid damper system according to claim 1, wherein, a brake mechanism including an electromagnetic effect target which is provided in the liquid damper and is a target of an electromagnetic effect and an electromagnetic effector which exerts the electromagnetic effect to the electromagnetic effect target is provided as the relative rotation unit.

9. The liquid damper system according to claim 8, wherein, the electromagnetic effect target is a conductor and the electromagnetic effector is a permanent magnet.

10. The liquid damper system according to claim 8, wherein, the electromagnetic effect target is a conductor and the electromagnetic effector is a coil.

11. The liquid damper system according to claim 9, wherein, the electromagnetic effect target is a magnetic body.

12. The liquid damper system according to claim 8, wherein, the electromagnetic effect target is a permanent magnet and the electromagnetic effector is a coil.

13. The liquid damper system according to claim 10, further comprising a current controller configured to control a current supplied to the coil.

14. The liquid damper system according to claim 1, wherein, a gear mechanism is provided as the relative rotation unit, the gear mechanism including gear portions formed on the outer circumferential surface of the liquid damper, a gear engaged with the gear portions, and a driving unit configured to generate a rotational torque in the liquid damper by rotating the gear.

15. The liquid damper system according to claim 14, wherein, the driving unit is a variable speed motor in which the rotation speed of an output shaft is variable.

16. The liquid damper system according to claim 5, wherein, the plate member is tilted toward downstream in the rotational direction as compared to the direction orthogonal to the outer circumferential surface of the liquid damper.

17. The liquid damper system according to claim 4, further comprising a fluid blowing unit configured to blow out fluid so that a hydrostatic pressure is exerted to the plate member in the direction opposite to the rotational direction.

18. The liquid damper system according to claim 5, further comprising a fluid blowing unit configured to blow out fluid so that a hydrostatic pressure is exerted to the plate member in the direction opposite to the rotational direction.

19. The liquid damper system according to claim 6, further comprising a fluid blowing unit configured to blow out fluid so that a hydrostatic pressure is exerted to the plate member in the direction opposite to the rotational direction.

20. The liquid damper system according to claim 10, wherein, the electromagnetic effect target is a magnetic body.

21. The liquid damper system according to claim 12, further comprising a current controller configured to control a current supplied to the coil.

22. The liquid damper system according to claim 1, wherein the liquid damper is configured to restrain vibrations occurring in the rotating body which is rotationally driven by a driving unit.

23. The liquid damper system according to claim 22, wherein the liquid damper is configured to restrain vibrations occurring in the rotating body which steadily rotates.

24. The liquid damper system according to claim 1, wherein the liquid damper is configured to restrain vibrations occurring in the rotating body which steadily rotates.

25. A liquid damper system for restraining vibrations occurring in a rotating body, comprising:

a liquid damper which is coaxially rotatable with the rotating body and includes a casing in which liquid is enclosed and a collision member which is provided to rotate together with the casing, the liquid colliding with the collision member when moving in a circumferential direction; and a relative rotation unit configured to cause the liquid damper to rotate relative to the rotating body.

\* \* \* \* \*